(12) United States Patent
Utsumi (10) Patent No.: US 12,045,867 B2
(45) Date of Patent: *Jul. 23, 2024

(54) ITEM IDENTIFICATION WITH LOW RESOLUTION IMAGE PROCESSING

(71) Applicant: NCR Voyix Corporation, Atlanta, GA (US)

(72) Inventor: Yoshitaka Utsumi, Kanagawa (JP)

(73) Assignee: NCR Voyix Corporation, Atlanta, GA (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/458,901

(22) Filed: Aug. 27, 2021

(65) Prior Publication Data

US 2021/0390300 A1 Dec. 16, 2021

Related U.S. Application Data

(63) Continuation of application No. 16/049,068, filed on Jul. 30, 2018, now Pat. No. 11,138,430.

(51) Int. Cl.
  *G06Q 30/0601* (2023.01)
  *G06Q 20/18* (2012.01)
  (Continued)

(52) U.S. Cl.
  CPC ......... *G06Q 30/0633* (2013.01); *G06Q 20/18* (2013.01); *G06Q 20/208* (2013.01);
  (Continued)

(58) Field of Classification Search
  CPC ........ G06V 20/52; G06V 20/64; G06V 20/20; G06V 20/68; G06V 10/764; G06V 40/10; G06V 30/10; G06V 20/00; G06V 10/82; G06V 10/17; G06V 20/62; G06V 10/147; G06V 40/103; G06V 30/224; G06V 10/40; G06V 10/454; G06V 20/10; G06V 2201/09; G06V 10/247; G06V 10/30; G06Q 10/087; G06Q 20/208; G06Q 20/203; G06Q 30/0639; G06Q 30/0629; G06Q 30/0643; G06Q 10/0875; G06Q 10/08; G06Q 30/0601; G06Q 30/0623; G06Q 30/06;
  (Continued)

(56) References Cited

U.S. PATENT DOCUMENTS 10,373,322 B1 * 8/2019 Buibas ............... G06T 7/246
11,049,170 B1 * 6/2021 Francis ............ G07G 1/0036
(Continued)

OTHER PUBLICATIONS

"U.S. Appl. No. 16/049,068, Advisory Action mailed Jul. 13, 2020", 2 pgs.
(Continued)

*Primary Examiner* — Golam Sorowar
(74) *Attorney, Agent, or Firm* — Schwegman Lundberg & Woessner, P.A.

(57) ABSTRACT

Images of an unknown item picked from a store are processed to produce a cropped image. The cropped image is processed to produce a brightness/perspective corrected image, and the brightness/perspective corrected image is processed to produce a low-resolution final image. Image features of the low-resolution final image are extracted and compared against known item features for known items to identify an item code for a known item.

12 Claims, 6 Drawing Sheets

(51) Int. Cl.
*G06Q 20/20* (2012.01)
*G06V 10/24* (2022.01)
*G06V 10/30* (2022.01)
*G06V 20/00* (2022.01)

(52) U.S. Cl.
CPC ............ *G06V 10/243* (2022.01); *G06V 10/30* (2022.01); *G06V 20/00* (2022.01)

(58) Field of Classification Search
CPC .......... G06Q 30/0633; G06Q 30/0641; G06Q 20/18; G06Q 30/0635; G06Q 40/08; G06Q 50/18; G06Q 10/0633
See application file for complete search history.

(56) References Cited

U.S. PATENT DOCUMENTS

| | | | |
|---|---|---|---|
| 2006/0256215 | A1 | 11/2006 | Zhang et al. |
| 2010/0123732 | A1 | 5/2010 | Jenks et al. |
| 2015/0381870 | A1 | 12/2015 | Weng et al. |
| 2017/0140144 | A1 | 5/2017 | Bock et al. |
| 2017/0147903 | A1* | 5/2017 | Booth ................. G06V 10/462 |
| 2017/0262795 | A1* | 9/2017 | Thapa ................. G06Q 10/087 |
| 2018/0218351 | A1 | 8/2018 | Chaubard et al. |
| 2019/0087966 | A1 | 3/2019 | Abdoo et al. |
| 2019/0281202 | A1 | 9/2019 | Chen et al. |
| 2019/0362135 | A1 | 11/2019 | Chan et al. |
| 2020/0302570 | A1* | 9/2020 | Pinatel ................. G06F 18/214 |
| 2023/0030779 | A1* | 2/2023 | DeLuca ............. G06V 10/7788 |

OTHER PUBLICATIONS

"U.S. Appl. No. 16/049,068, Final Office Action mailed Apr. 20, 2020", 24 pgs.

"U.S. Appl. No. 16/049,068, Non Final Office Action mailed Feb. 1, 2021", 28 pgs.

"U.S. Appl. No. 16/049,068, Non Final Office Action mailed Dec. 23, 2019", 22 pgs.

"U.S. Appl. No. 16/049,068, Notice of Allowance mailed Jun. 7, 2021", 13 pgs.

"U.S. Appl. No. 16/049,068, Response filed Mar. 23, 20 to Non Final Office Action mailed Dec. 23, 2019", 9 pgs.

"U.S. Appl. No. 16/049,068, Response filed May 3, 21 to Non Final Office Action mailed Feb. 1, 2021", 9 pgs.

"U.S. Appl. No. 16/049,068, Response filed Jul. 2, 20 to Final Office Action mailed Apr. 20, 2020", 9 pgs.

U.S. Appl. No. 16/049,068 U.S. Pat. No. 11,138,430, filed Jul. 30, 2018, Item Identification with Low Resolution Image Processing.

* cited by examiner

FIG. 1A

Upper Shelf

Middle Shelf

Lower Shelf

FIG. 1B

Sample Image

Manual Crop : image size shrunk to 800x600 pxls then cropped

Beer

Beer Label only

ITEM IDENTIFICATION WITH LOW RESOLUTION IMAGE PROCESSING

CROSS REFERENCE TO RELATED APPLICATION

This application is a continuation of U.S. patent application Ser. No. 16/049,068, filed Jul. 30, 2018, which application and publication is incorporated herein by reference in its entirety.

BACKGROUND

Increasingly retailers are deploying technology to automate the shopping experience. Routinely, consumers can now user their mobile devices to purchase items and perform self-checkouts from stores. The next advancement is with frictionless stores, where consumers simply walk into a store and grab the items they want to purchase and leave the store without any interaction with a Self-Service Terminal (SST), a store attendant, and/or their mobile devices.

However, there are significantly technological challenges before the above scenario can be fully deployed in the industry. One of the biggest challenges is item detection when an image being processed within the store shows a consumer picking up an item and placing it in a consumer's bag or hand. A variety of image processing is needed to properly identify the item in the image.

A significant issue with item identification from image processing is that it is computationally expensive and it requires substantial network bandwidth in order to timely pass image files around a network of devices that process the images for item identification. Generally, the existing technology suffers from the requirement of having to deploy and rely on extensive computational resources, with massive databases, and expensive network bandwidth resources and connections. Even with such superior hardware resources, response times for item identification are slower than what is needed in any acceptable frictionless store environment.

Existing approaches rely on high quality images (increased pixel density) for detailed image analysis that includes being able to handle a variety of different lighting conditions present in the images and a variety of different item rotations and orientations present in any of the captured images.

Accordingly, there is a need to provide improved image processing for real-time item identification.

SUMMARY

In various embodiments, methods and a system for item identification with low-resolution image processing are presented.

According to an embodiment, a method for item identification with low-resolution image processing is presented. Specifically, and in one embodiment, images are obtained from a shelf of a store. A cropped image is produced from the images representing an unknown item picked from the shelf. The cropped image is processed to produce a final low-resolution image for the unknown item. Finally, a known item is identified from the final low-resolution image.

DETAILED DESCRIPTION

Figure 1A:
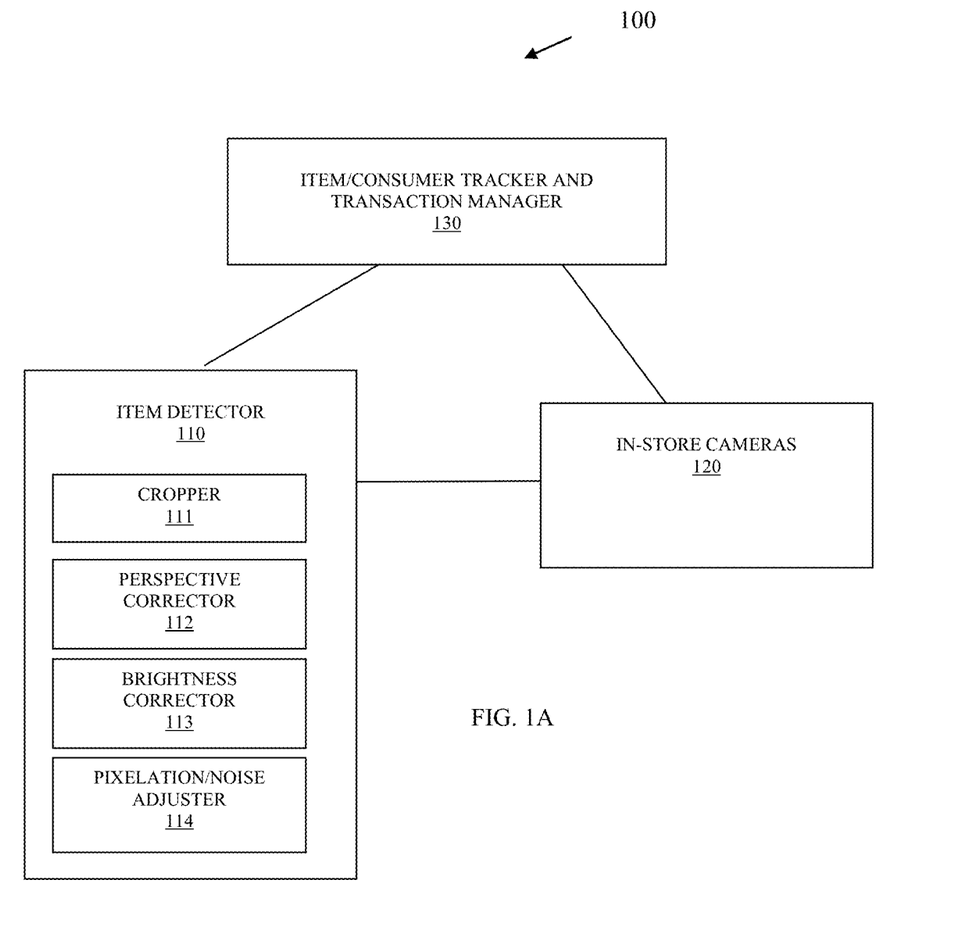
FIG. 1A is a diagram of a system for item identification with low-resolution image processing, according to an example embodiment.

FIG. 1 is a diagram of a system 100 for item identification with low-resolution image processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of item identification with low-resolution image processing, presented herein and below.

The system 100 includes: an item detector 110, a plurality of in-store cameras 120, and an item/consumer tracker and transaction manager 130.

The cameras 120 capture images of a consumer that is shopping in a store. The images are tracked and processed for purposes of identifying the consumer and identifying items (products) that the consumer picks up (has in the consumer's possession) when the consumer exits the store.

The item/consumer tracker and transaction manager 130 is responsible for identifying a unique consumer that is being tracked while in the store along with the items that are in the possession of the consumer while the consumer traverses the store and when the consumer exits the store. The item/consumer tracker and transaction manager 130 may also perform transaction processing to charge and account or a payment card registered to the consumer for the item prices of the items that the consumer purchases.

The images captured for the items are tracked as unknown items by the item/consumer tracker and transaction manager 130 until the item detector 110 provides item identifications for the unknown items. When the item detector 110 provides the item identification or item code, the item/consumer tracker and transaction manager 130 can access an item database with the item code and retrieve the item description and item price for the transaction of the consumer.

The item detector 110 is provided as a set of executable instructions that reside in a non-transitory computer-readable storage medium and that are processed on one or more hardware processors of an in-store server or a network-edge device that is on the edge of or proximate to the in-store server.

The set of executable instructions for the item detector 110 includes functions, routines, or modules representing: an image cropper 111, a perspective corrector 112, a brightness/lighting corrector 113, and a pixilation/noise adjuster 114.

The cameras 120 are focused on the aisles and shelves of the store and the shelves include the store's items. The cameras 120 are continuously and regularly capturing images of the items as they reside on the shelves within the aisles of the store. In some cases, the cameras are stationary in other cases the cameras are handheld or available from carts of the consumers. That is the configuration of the cameras 120 can be changed and the cameras 120 can wirelessly, in some cases, communicate images to the tracker 130 and detector 110.

When two different images taken from a camera 120 of a shelf location are different from one another, this provides an indication that an item that was on the shelf was picked from the shelf. The cropper 111 subtracts the second image from the first image taken of the shelf. The resulting image is a cropped image of the item that was picked from the shelf.

When an unknown item image for a currently unknown item is provided from a camera 120, the cropper 111 is initially processed. This is done to obtain a general item appearance and distinguish the item from its background.

In an embodiment, the cropper 111 also processes an auto self-alignment algorithm for item image position of the resulting image between the two first and second images.

In an embodiment, the cropper 111 also identifies when the item image is associated with dark colored pixels (such as a brown beer bottle) and crops the resulting image around the label portion of the resulting image (so as to exclude the dark colored pixels from the cropped resulting image).

The cropper 111 also reduces the size of the resulting image by removing as much background pixels detected in the resulting image as possible, focusing on the item itself, and/or the edge pixels and pixels within the edges of the resulting image.

Figure 1B:
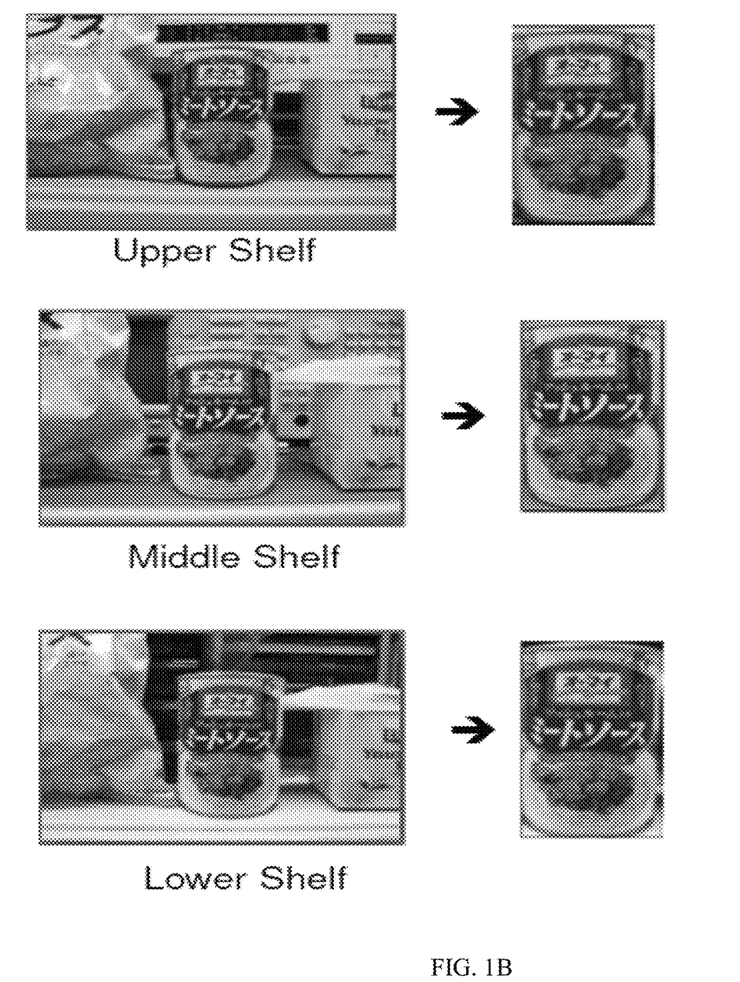
FIG. 1B illustrates images of an item taken when the item is on a shelf and resulting images produced for item detection, according to an example embodiment.
Figure 1C:
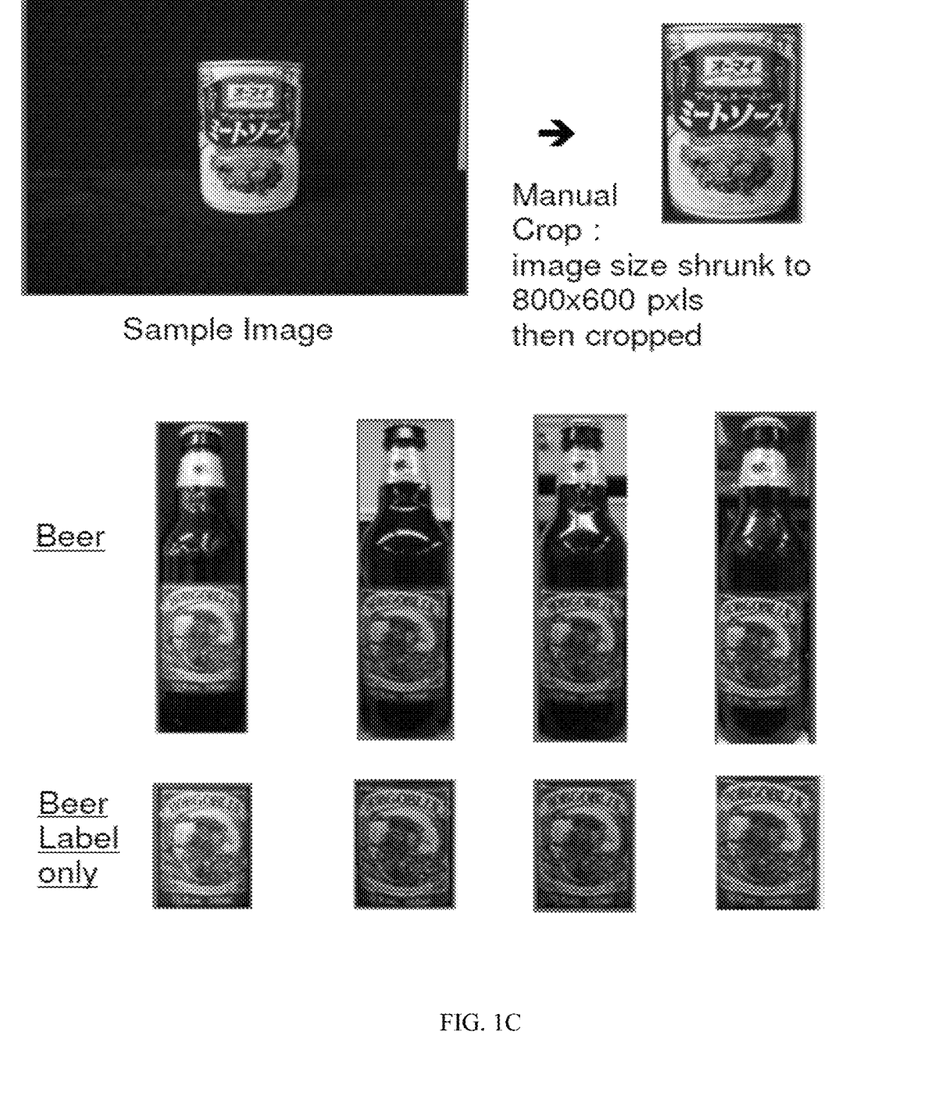
FIG. 1C illustrates images of an item that are further cropped to remove background pixels and focus on item labeling or item differentiation pixels, according to an example embodiment.

The result of the cropper 111 is a cropped image representing pixels associated with a picked item from a shelf. Some example illustrations of the first image captured by the cameras 120 and the second cropped and resulting image produced by the cropper 111 are shown in the FIGS. 1B-1C. FIG. 1C illustrates just the fully cropped image having the removal of as much background pixels as possible and a focus in the cropped image on the label of the cropped image for a dark colored beer bottle.

After the cropper 111 has produced a cropped version of the item image from the two images taken from the shelf before and after a consumer picked an item from the shelf, the perspective corrector 112 is processed on the cropped image of the item.

The perspective corrector 112 is processed because the cropped item image provided by the cropper 112 is not always taken at the same angles by the cameras 120. The cameras 120 may capture the item images at different perspective angles (downward, upward, side views, off horizontal, etc.). The item images at various angles increase the likelihood of false identifications for the item. The various angles captured in the item images may also present a deformed version of the item, which reduces item similarity for known items that the item images are associated with.

The distances and angles for the field-of-view in the lens for each camera 120 is preconfigured and known as configuration settings associated with each camera 120, such that the images for the item that were initially processed by the cropper 111 (first image and second image with the item removed from the shelf) also identifies the cameras that provided such images to the cropper 111.

Based on these configuration settings, the perspective corrector 112 performs a pixel angle correction that is plus or minus 30 degrees in both the horizontal and vertical of the cropped image. For the angle variance within the range of +/−30 degrees of the horizontal and vertical, the perspective corrector 112 looks not to be necessarily as long as the background effect is small (as stated above the cropper 111 performs background image cropper over a smaller size than the resulting image itself).

The perspective corrector 112 produces a perspective corrected image from the cropped resulting image provided by the cropper 111. The perspective corrected image is then provided to the brightness corrector 113.

Similar to the perspective corrector 112, the brightness corrector 113 relies on preconfigured settings known for the cameras 120 that provide the initial images from which the resulting cropped image is produced from the cropper 111. The variations of captured item image in the camera's facing angle, distance towards the camera 120, and illuminations cause variations in the item's perceived surface within the perspective corrected image provided by the perspective corrector 112. This effect can also cause false product identification as image brightness characteristics reduce item similarities for item comparison processing.

The perspective corrected image is provided in Red Green Blue (RGB) colors (as captured by the cameras 120). The brightness corrector 113 converts the pixels in perspective corrected image from RGB to Hue Saturation Values (HSV) providing a measure for Red values within the image for the Hue, how red with the Saturation, and black and white pixel values for the Values. The purpose of this conversion is to identify remove shading from the perspective corrected image. The HSV values for the initial RGB provided perspective corrected image are re-weighted by the brightness corrector 113 by a factor of one third ($\frac{1}{3}$) and a brightness corrected item image is provided from the perspective corrected image by the brightness corrector 113.

Next, the brightness corrected image is provided to the pixelation/noise adjuster 114. The pixelation/noise adjuster 114 performs a pixel resolution algorithm on the brightness corrected image to reduce the size and resolution of the item image. This substantially reduces the size of the item image and also increases item differentiation because effects noticed by the human eye are reduced in the lower-resolution image, such as alignment, packaging deformation, shading, item surface glare by lighting, and just pixels that differentiate the item remain. The pixelation/noise adjuster 114 may also process a noise reduction algorithm on the pixels of the brightness corrected image.

In an embodiment, the pixelation/noise adjuster 114 reduces the brightness corrected image to approximately a size of 60 total pixels (5×12, 9×7, 6×10, etc.) having a signal to noise threshold ration of 3.

The pixelation/noise adjuster 114 produces a final version of the item image from the brightness corrected image.

The item detector 110 returns the final version of the image to the item/consumer tracker and transaction manager 130. The item/consumer tracker and transaction manager 130 performs item comparison on features of the final image to score and identify the item and obtain an item identifier (item code or item description). In an embodiment, the item detector 110 performs feature extraction on the final image and scores such features to provide an item code or item identifier to the item/consumer tracker and transaction manager 130.

The processing described above is performed for each item and corresponding item images captured by the cameras 120 that a consumer picks or takes from the shelves of a frictionless store. The processing increases item identification accuracy, reduces computational resources needed for image processing, reduces item identification response times from the image processing, and reduces network bandwidth needed in a frictionless store. The final image produced for item identification is extremely reduced in size and is of a substantially reduced resolution from that which was initially captured by the cameras 120, which means that item identification is increased substantially over past attempts.

These and other embodiments are now discussed with reference to the FIGS. 2-4.

Figure 2:
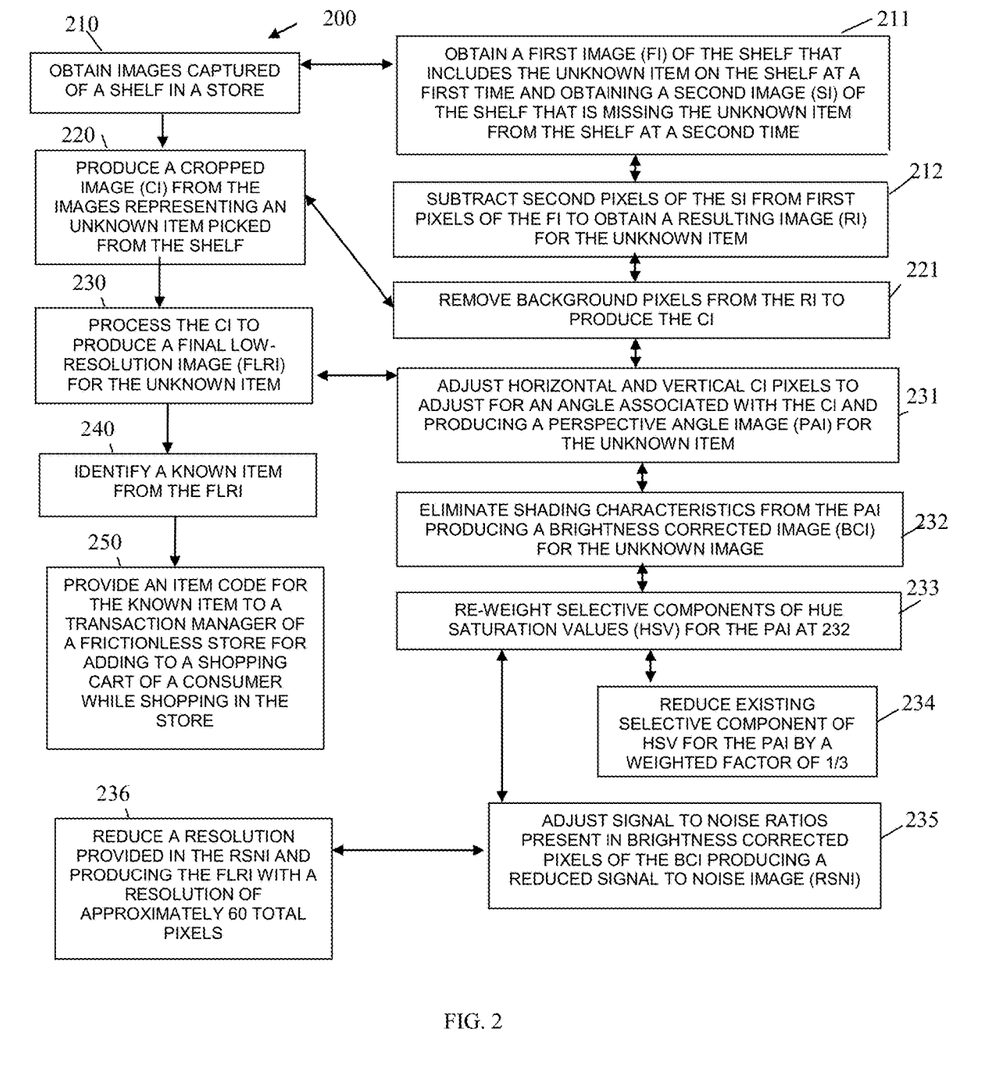
FIG. 2 is a diagram of a method for item identification with low-resolution image processing, according to an example embodiment.

FIG. 2 is a diagram of a method 200 for item identification with low-resolution image processing, according to an example embodiment. The software module(s) that implements the method 200 is referred to as an "item identifier." The item identifier is implemented as executable instructions programmed and residing within memory and/or a non-transitory computer-readable (processor-readable) storage medium and executed by one or more processors of a device. The processor(s) of the device that executes the item identifier are specifically configured and programmed to process the item identifier. The item identifier has access to one or more network connections during its processing. The network connections can be wired, wireless, or a combination of wired and wireless.

In an embodiment, the device that executes the item identifier is a server. In an embodiment, the server is a cloud processing environment that comprises multiple servers cooperating with one another as a single server. In an embodiment, the server is a Local Area Network (LAN) server.

In an embodiment, the device that executes the item identifier is a network-edge device that is local or proximate to an edge of a LAN of a retail store.

In an embodiment, the item identifier is the item detector 110 (including the cropper 111, the perspective corrector 112, the brightness corrector 113, and the pixelation/noise adjuster 114) according to the FIG. 1A.

At 210, the item identifier obtains images captured for a shelf in a store. Some example images were provided in the FIG. 1B. Cameras 120 are situated throughout a store and are continuously providing images for locations on the shelf. Each shelf including a plurality of items (products) being offered for sale in the store.

In an embodiment, at 211, the item identifier obtains a first image of the shelf that includes the unknown item on the shelf at a first time and obtaining a second image of the shelf that is missing the unknown item from the shelf at a second time.

In an embodiment of 211 and at 212, the item identifier subtracts second pixels of the second image from first pixels of the first image to obtain a resulting image for the unknown item. That is, the first image includes pixels representing the unknown item on the shelf whereas when the item is picked from the shelf, the second image shows the shelf missing the unknown item. By subtracting the second image pixels from the first image pixels, the pixels associated with the unknown item are present in in the resulting image from the subtraction.

At 220, the item identifier produces a cropped image from the images representing an unknown item picked from the shelf.

In an embodiment of 212 and 220, at 221, the item identifier removes background pixels from the resulting image to produce the cropped image. This was discussed above and illustrated in the FIGS. 1B and 1C.

At 230, the item identifier processes the cropped image to produce a final low-resolution image for the unknown item.

In an embodiment of 221 and 230, at 231, the item identifier adjusts horizontal and vertical cropped image pixels to adjust for an angle associated with the cropped image and producing a perspective angle image for the unknown item.

In an embodiment of 231, at 232, the item identifier eliminates shading characteristics from the perspective angle image producing a brightness corrected image for the unknown image.

In an embodiment of 232 and at 233, the item identifier re-weights HSV for the perspective angle image when eliminating the shading characteristics.

In an embodiment of 233 and at 234, the item identifier reduces selective component values of existing HSV for the perspective angle image by a weighted factor of one-third (⅓).

In an embodiment of 233 and at 235, the item identifier adjusts signal to noise ratios present in brightness corrected pixels of the brightness corrected image producing a reduced signal to noise image.

In an embodiment of 235 and at 236, the item identifier reduces a resolution provided in the reduced signal to noise image and producing the final low-resolution image with a resolution of approximately a size of 60 total pixels (5×12, 6×10, 9×7, 8×7, etc.).

At 240, the item identifier identifies a known item from the final low-resolution item.

In an embodiment, at 250, the item identifier provides an item code for the known item to a transaction manager of a frictionless store for adding to a shopping cart of a consumer while shopping in the store.

Figure 3:
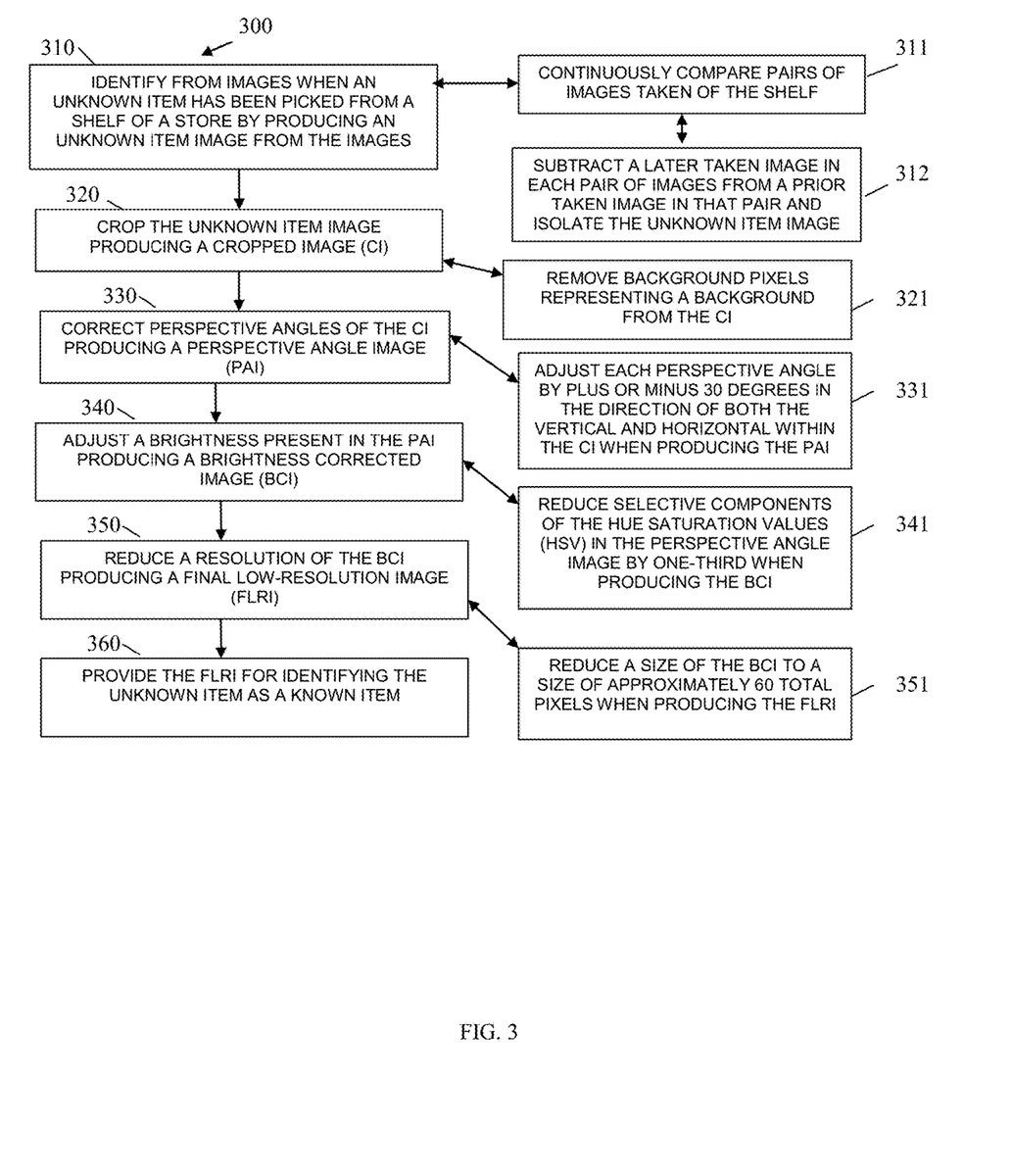
FIG. 3 is a diagram of another method for item identification with low-resolution image processing, according to an example embodiment.

FIG. 3 is a diagram of another method 300 for item identification with low-resolution image processing, according to an example embodiment. The software module(s) that implements the method 300 is referred to as an "item image detector." The item image detector is implemented as executable instructions programmed and residing within memory and/or a non-transitory computer-readable (processor-readable) storage medium and executed by one or more processors of a device. The processors that execute the item image detector are specifically configured and programmed to process the item image detector. The item image detector has access to one or more network connections during its processing. The network connections can be wired, wireless, or a combination of wired and wireless.

In an embodiment, the device that executes the item image detector is a server. In an embodiment, the server is a cloud processing environment that comprises multiple servers cooperating with one another as a single server. In an embodiment, the server is a LAN server that is local to a retail store.

In an embodiment, the device that executes the item image detector is a network-edge device that is on the edge of a LAN for a retail store.

In an embodiment, the item image detector is all or some combination of the item detector 110 and/or the method 200.

The item image detector presents another and in some ways enhanced processing perspective to that which was described above with the FIG. 2.

At 310, the item image detector identifiers from images when an unknown item has been picked from a shelf of a store by producing an unknown item image from the images.

In an embodiment, at 311, the item image detector continuously compares pairs of images taken of a shelf. The shelf including items (products) being offered for sale in a frictionless store.

In an embodiment of 311 and at 312, the item image detector subtracts a later taken image in each pair of images from a prior taken image in that pair and isolates the unknown item image.

At 320, the item image detector crops the unknown item image producing a cropped image.

In an embodiment, at 321, the item image detector remove background pixels representing a background from the cropped image.

At 330, the item image detector corrects perspective angles of the cropped image producing a perspective angle image.

In an embodiment, at 331, the item image detector adjusts each perspective angle by plus or minus 30 degrees in the direction of both the vertical and horizontal within the cropped image when producing the perspective angle image.

At 340, the item image detector adjusts a brightness present in the perspective angle image producing a brightness corrected image.

In an embodiment, at 341, the item image detector reduce selective component values of the HSV in the perspective angle image by one-third when producing the brightness corrected image.

At 350, the item image detector reduces a resolution of the brightness corrected image producing a final low-resolution image.

In an embodiment, at 351, the item image detector reduces a size of the brightness corrected image to approximately 60 total pixels when producing the final low-resolution image.

At 360, the item image detector provides the final low-resolution image for identifying the unknown item as a known item.

Figure 4:
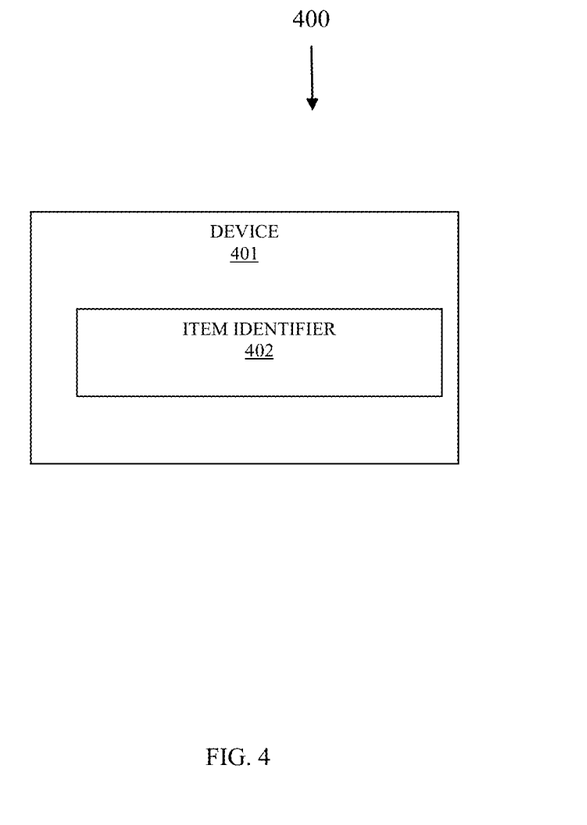
FIG. 4 is a diagram of a system for item identification with low-resolution image processing, according to an example embodiment.

FIG. 4 is a diagram of a system 400 for item identification with low-resolution image processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401 and an item identifier 402.

In an embodiment, the processing device 401 is a server. In an embodiment, the server is a collection of servers that cooperate as a cloud processing environment.

In an embodiment, the processing device 401 is a network edge device.

The item identifier 402 is a set of executable instructions that is executed on one or more hardware processors of the processing device 401 from a non-transitory computer-readable storage medium or memory.

The item identifier 402 is configured to: i) identify an unknown item from a plurality of images captured for a shelf of a store having the unknown item and a plurality of other items, ii) isolate an unknown item image from the plurality of images, iii) crop the unknown item image producing a cropped image, iv) correct a perspective angle of the cropped image producing a perspective angle image, v) adjust a brightness of the perspective angle image producing a brightness corrected image, vi) reduce a size of the brightness corrected image producing a low resolution image, and vii) provide the low resolution image for identifying a known item represented in the low resolution item that was picked from the shelf in the store by a consumer.

In an embodiment, the item identifier 402 is provided within the store as a component of a frictionless store system.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining a first image of a shelf at a first time;
   obtaining a second image of the shelf at a second time;
   subtracting the second image from the first image and producing an unknown item image;
   removing background pixels associated with the shelf from the unknown item image producing a modified image;
   adjusting remaining pixels associated with the modified image producing an adjusted image; and
   identifying a known item for an unknown item based on the adjusted image.

2. The method of claim 1 further comprising, providing an item code associated with the known item to a transaction manager to add details for the item code to a shopping cart associated with a consumer.

3. The method of claim 1, wherein obtaining the second image further includes obtaining the first image and the second image from a stationary camera focused on the shelf.

4. The method of claim 1, wherein obtaining the second image further includes obtaining the first image and the second image from a camera associated with a shopping cart of a consumer.

5. The method of claim 1, wherein adjusting further includes cropping a label portion associated with a label from the modified image producing the adjusted image when the modified image includes dark colored pixels for the unknown item.

6. The method of claim 1, wherein adjusting further includes processing pixel angle corrections horizontally and vertically on modified image pixels of the modified image and producing the adjusted image.

7. The method of claim 6, wherein processing further includes adjusting a brightness of the modified image pixels removing shading from the modified image and producing the adjusted image.

8. The method of claim 7, wherein processing further includes processing a pixel resolution algorithm reducing a size of the modified image and producing the adjusted image as a lower resolution image from the modified image.

9. The method of claim 1, wherein processing the pixel resolution algorithm further includes producing the lower resolution image as approximately 60 total pixels with a signal to a noise ratio of approximately 3 for the adjusted image.

10. The method of claim 1, wherein providing further includes providing the adjusted image to an item tracker as input and returns as output an item code for the known item.

11. A system, comprising:
at least one camera;
a server comprising a processor and a non-transitory computer-readable storage medium;
the non-transitory computer-readable storage medium comprising executable instructions;
the executable instructions executed by the processor from the non-transitory computer-readable storage medium causing the processor to perform operations comprising:
receiving a first image taken of a shelf at a first time from the at least one camera;
receiving a second image taken of the shelf at a second time from the at least one camera;
subtracting the first image from the second image producing a third image comprising unknown item pixels for an unknown item that was picked off the shelf by a consumer;
adjusting the third image pixels of the third image for angle and brightness producing a fourth image;
reducing a resolution of fourth image pixels of the fourth image by removing pixelization and noise producing a fifth image;
providing the fifth image to an item tracker;
receiving from the item tracker an item code for a known item; and
providing the item code to a transaction manager to associate a known item with a shopping cart of the consumer being managed by the transaction manager.

12. The system of claim 11, wherein the at least one camera is a stationary camera or a camera affixed to the shopping cart of the consumer.

* * * * *